United States Patent [19]

Homan et al.

[11] Patent Number: 4,530,882

[45] Date of Patent: Jul. 23, 1985

[54] COATING METHOD AND SILICONE COMPOSITION FOR PSA RELEASE COATING

[75] Inventors: Gary R. Homan; David L. Stickles, both of Midland, Mich.

[73] Assignee: Dow Corning Corporation, Midland, Mich.

[21] Appl. No.: 685,525

[22] Filed: Dec. 24, 1984

Related U.S. Application Data

[62] Division of Ser. No. 585,748, Mar. 2, 1984.

[51] Int. Cl.$^3$ ............................ B32B 9/06; B05D 3/02
[52] U.S. Cl. ................................ 428/452; 427/208.4; 427/208.6; 427/208.8; 427/377; 156/306.3; 156/329; 428/447; 428/448
[58] Field of Search ............... 427/208.4, 208.6, 208.8, 427/387, 377, 391; 428/448, 447, 452; 156/329, 306.3

[56] References Cited

U.S. PATENT DOCUMENTS

| | | | |
|---|---|---|---|
| 3,032,438 | 5/1962 | Gaynes et al. | 427/208.8 X |
| 4,042,643 | 8/1977 | Creasey et al. | 427/208.4 X |
| 4,191,817 | 3/1980 | Schiller et al. | 528/38 |
| 4,342,815 | 8/1982 | Doehnert | 427/208.4 X |
| 4,370,358 | 1/1983 | Hayes et al. | 427/208.4 X |
| 4,387,177 | 6/1983 | Mine et al. | 524/425 |
| 4,417,042 | 11/1983 | Dziark | 528/18 |
| 4,443,491 | 4/1984 | McIntyre | 427/208.4 X |
| 4,472,551 | 9/1984 | White et al. | 528/21 X |

*Primary Examiner*—Thurman K. Page
*Attorney, Agent, or Firm*—George A. Grindahl

[57] ABSTRACT

Moisture-curable silicone compositions for adhesive-release coatings comprising an alkoxysilylorganosiloxane, a titanium ester and an aminoorganosiloxane have an adhesive-release force, when cured, which is directly related to the amount and type of aminoorganosiloxane. The compositions are useful for coating a flexible sheet material, such as paper or polymeric film, to provide a surface that will release pressure sensitive adhesive with a pre-selected release force of up to 400 g/in (154 N/m). Thin coatings of the composition cure in as little as 15 seconds when exposed to moisture.

14 Claims, No Drawings

COATING METHOD AND SILICONE COMPOSITION FOR PSA RELEASE COATING

This application is a division, of application Ser. No. 585,748, filed Mar. 2, 1984.

BACKGROUND OF THE INVENTION

The present invention relates to coating compositions for providing controlled release of pressure sensitive adhesives (PSAs) adhered thereto. More precisely, the present invention relates to moisture-curable silicone compositions which cure rapidly, when they are applied to a substrate and exposed to moisture, and provide a cured coating on the substrate which will release various pressure sensitive adhesives with a pre-selected force.

Rapidly curable coating compositions are required in fast-paced coating operations, such as paper or fiber coating operations, wherein, in rapid succession, a curable composition is applied to a substrate, the applied composition is cured and the coated substrate is subjected to further operations such as packaging, spooling, rolling, cutting or further coating.

Homan has disclosed rapidly curing, moisture-curable coating compositions in U.S. Ser. No. 520,793; entitled "Coating Process and Moisture-Curable Organopolysiloxane Compositions Therefor", which was filed on Aug. 5, 1983 and which is assigned to the assignee of the present invention. The compositions and process of Homan provide a means for coating a substrate, such as paper, with a cured, adhesive-releasing coating in as little as 10 seconds at room temperature. However, there are some instances when the preferred compositions of Homan, which are predominantly polydimethylsiloxane compositions, provide undesirably low release of pressure sensitive adhesives.

For example, in a process for preparing pressure sensitive adhesive labels a laminate of adhesive-bearing label stock and silicone-bearing backing paper is die-cut on its label stock side to provide a plurality of labels surrounded by a waste matrix, both still adhered to the backing paper. The waste matrix is typically rapidly stipped away and discarded, leaving only the die-cut labels adhered to the uncut backing paper. For such a process it is highly desirable that the force required to separate the adhesive from the coating be sufficiently low to allow easy stripping of the waste matrix but sufficiently high to retain the labels on the backing paper during the stripping operation. Typically a release force of from 100 to 200 grams/inch (38.6 to 77.2 N/m) is desired for such a process.

For another example, in the preparation of rolls of pressure sensitive adhesive tape a support material, such as paper or polymeric film, is provided with a cured silicone release coating and a pressure sensitive adhesive coating. The resulting stock is rolled into a roll configuration so that the adhesive coating is adhered to the silicone release coating over substantially its entire surface. In such a product the force required to separate the adhesive from the coating should be sufficiently low to allow the easy unwinding of the roll of tape, when desired, but sufficiently high to retain the tape in the roll configuration during the preparing, storing and handling of the roll. Typically a release force of from 200 to 400 grams/inch (77.2 to 154.4 N/m) is desired for such an article.

The predominantly polydimethylsiloxane-based compositions of Homan typically release styrene-butadiene rubber (hereinafter SBR) pressure sensitive adhesives with a force less than 100 g/in. (38.6 N/m); however, as noted above, a release force of greater than 100 g/in. is frequently needed. There is therefore a need for improved moisture-curable silicone release coatings wherein their adhesive-release forces can be increased when desired.

BRIEF SUMMARY OF THE INVENTION

It is an object of the present invention to provide improved, rapidly curing, moisture-curable silicone coating compositions. It is also an object of the present invention to provide rapidly curing, moisture-curable silicone coating compositions that have a pre-selected release force for pressure sensitive adhesives. It is a further object of this invention to provide a method for varying the adhesive-releasing characteristics of a rapidly-curing, moisture curable silicone coating composition.

These objects, and others which will occur to one upon consideration of the following disclosure and appended claims, are obtained by mixing, under substantially anhydrous conditions, components comprising certain alkoxy-substituted polydimethylsiloxanes, certain titanate esters, or certain derivatives thereof, and certain aminoorganosiloxanes, applying the resulting composition to a substrate and exposing the applied composition to a moisture-containing environment until the composition is cured. Subsequently a pressure sensitive adhesive composition is applied to the cured coating to form an adhesive/release coating interface. The force that is required to separate the adhesive from the release coating is determined by the nature and relative amount of the aminoorganosilicon compound, herein also designated a controlled release additive (CRA).

The three aspects of the invention, summarized above, i.e. a composition, a method for coating a substrate to provide controlled release of pressure sensitive adhesives therefrom and a method for preparing an adhesive/release coating interface having a preselected release force at the interface, will now be described in detail.

DETAILED DESCRIPTION OF THE INVENTION

In a first aspect the present invention relates to a liquid composition which cures when applied to a substrate and exposed to moisture, said liquid composition being prepared by mixing, under substantially anhydrous conditions, components comprising (A) 100 parts by weight of an organopolysiloxane fluid bearing an average of at least two silicon-bonded, alkoxysilylorganic radicals per molecule, said radicals having the formula $-QSiR_a^1(OR^2)_{3-a}$ and said organopolysiloxane fluid having the formula $ZR_2^1SiO(Me_2SiO)_x(MeRSiO)_ySiR_2^1Z$, (B) a titanium ester, or a partial hydrolyzate or partial alcoholate thereof, soluble in said liquid composition, in sufficient amount to provide from 0.5 to 4.0 parts by weight of titanium, and (C) from 0.5 to 50 parts by weight of an aminoorganosiloxane bearing an average of at least 1 silicon-bonded aminoorgano radical per molecule, said aminoorgano radical having the formula $-Q(NR^3CH_2CH_2)_mNHR^3$, all other silicon-bonded radicals of the aminoorganosiloxane being selected from the group consisting of siloxane oxygen atoms, $R^1$ radicals and $OR^2$ radicals; wherein, independently at each occurrence in the components, R denotes the $-QSiR_a^1(OR^2)_{3-a}$ radical;
$R^1$ denotes a monovalent hydrocarbon radical having from 1 to 6, inclusive, carbon atoms;
$R^2$ denotes a methyl, ethyl, propyl or methoxyethyl radical;
$R^3$ denotes a H atom or an $R^1$ radical;
Q denotes an alkylene radical;
Z denotes an R radical or an $R^1$ radical;
Me denotes a methyl radical;
a has a value of 0 or 1;
x has an average value of from about 50 to 500;
y has an average value of from 0 to $(x+y)/4$; and
m has a value of from 0 to about 3.

The compositions of this invention are liquid compositions. That is to say, the compositions of this invention can be applied to a substrate by flowing, spreading, extruding, rolling, brushing and the like. When the compositions of this invention are exposed to moisture they cure to the non-liquid state.

Component (A) of the compositions of this invention can be any organopolysiloxane fluid having the formula (Ia) which contains at least two R radicals.

$$ZR_2^1SiO(Me_2SiO)_x(MeRSiO)_ySiR_2^1Z \qquad (Ia)$$

R denotes an alkoxysilylorganic radical having the formula $-QSiR_a^1(OR^2)_{3-a}$ which can be bonded to terminal siloxane units, when Z denotes R, and/or to non-terminal siloxane units of the organopolysiloxane, when y is 1 or more.

In the alkoxysilylorganic radical shown above Q denotes an alkylene radical, preferably containing from 2 to 8 carbon atoms. The specific structure of Q is not critical as along as it does not adversely effect the utility of the compositions of this invention as a rapidly curing, paper-coating composition. Examples of suitable Q radicals include, but are not limited to,

$-CH_2CH_2-$, $-CH_2CH_2CH_2-$, $-CH_2CH(CH_3)$, $-CH_2CH_2CH_2CH_2-CH_2CH(CH_3)CH_2-$.

Typically the Q radical is further selected on the basis of organopolysiloxane synthesis methods and starting materials therefor, further delineated below. For example, Q can be $-C_2H_4-$ or $-C_3H_6-$ which arise from readily available vinyl- or allyl-substituted silanes or siloxanes.

In the alkoxysilylorganic radical shown above, and in the organopolysiloxanes (Ia), $R^1$ denotes any monovalent hydrocarbon radical having from 1 to 6, both inclusive, carbon atoms. Examples of $R^1$ radicals include alkyl radicals, such as methyl, ethyl, propyl, butyl, pentyl and hexyl; cycloaliphatic radicals, such as cyclohexyl; aliphatically unsaturated radicals, such as vinyl, allyl, butenyl and cyclohexenyl; and aryl radicals, such as phenyl. $R^1$, at each occurrence, is preferably the methyl radical in view of its favorable adhesive-releasing characteristics, ready availability and ease of preparation.

In the alkoxysilylorganic radical each $R^2$ denotes a radical selected from the group consisting of methyl, ethyl, propyl and methoxyethyl radicals. For rapid curing of the compositions of this invention on a paper substrate, as measured by the smear, migration and rub-off tests delineated below, it is preferred that each $R^2$ be a methyl radical. For maximum cure rate for any particular composition of this invention the alkoxysilylorganic radicals are preferably trialkoxysilylorgano radicals ($-QSi(OR^2)_3$), such as $-QSi(OMe)_3$ radicals; however, $-QSiMe(OMe)_2$ radicals also provide highly desirable cure rates.

In formula (Ia) Me denotes a methyl radical, Z denotes either an R radical or an $R^1$ radical, and R and $R^1$ have the meanings delineated above, including preferred delineations thereof.

The value of x in formula (Ia) is preferably from 50 to 500, and most preferably from 100 to 400. The lower limit of 50 dimethylsiloxane units is established in order to provide a preferred lower level of adhesive release for the coating compositions of this invention.

The value of y in formula (Ia) can be from 0 (in which case each Z must be an R radical) to $(x+y)/4$ (in which case each Z may be an R radical or an $R^1$ radical). The maximum value of y should not exceed the value of $(x+y)/4$; that is, 25 mol percent of the total number of internal siloxane units in the organopolysiloxane (Ia), in order to provide a catalyzed composition that has a resistance to gelling in storage. For organopolysiloxanes (Ia) wherein the value of $x+y$ exceeds about 120 the value of y need not exceed the value of $3600/(x+y)$ in order to provide ideally rapid cure rates for the catalyzed compositions of this invention.

Thus as the value of $x+y$ is increased from 50 to $66\frac{2}{3}$ to 120 and higher, and the value of x is at least 50, the maximum permissible value of y ranges from 0 to $16\frac{2}{3}$ to 30 and higher, respectively; however, the maximum ideal value of y ranges from 0 to $16\frac{2}{3}$ to 30 and then to progressively lower values, respectively. Ideally then, the organopolysiloxanes (Ia) have no more than about 30 internal R radicals per molecule.

As noted above, $R^1$ and $R^2$ are preferably methyl radicals, thereby giving rise to organopolysiloxanes having the formula (Ib) as a highly preferred component (A) of the compositions of this invention, wherein Z denotes Me or R.

$$ZMe_2SiO(Me_2SiO)_x(MeRSiO)_ySiMe_2Z \qquad (Ib)$$

In addition, each R radical in (Ib) is preferably $-Q-SiMe_a(OMe)_{3-a}$ for the reasons noted above. The value of $x+y$ in formula (Ib) is preferably from about 100 to about 400 and the value of y is preferably from 0 to about $3600/(x+y)$ when the value of $x+y$ is 120 or greater and from 0 to about $(x+y)/4$ when the value of $x+y$ is less than 120. That is to say, as the value of $x+y$ in formula (Ib) increases beyond 120 the preferred number of alkoxysilylorganic radicals that are present in component (A) decreases.

Preferred examples of component (A) which have the formula (Ib) are obtained when Q is an ethylene radical of the formula $-CH_2CH_2-$. Structures having the formula (Ib) and being further illustrated by the examples disclosed below include

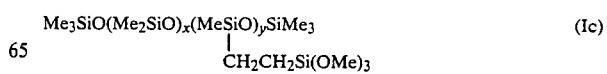

$$Me_3SiO(Me_2SiO)_x(MeSiO)_ySiMe_3 \qquad (Ic)$$
$$| \\ CH_2CH_2Si(OMe)_3$$

$$(MeO)_3SiCH_2CH_2(Me)_2SiO(Me_2SiO)_xSi(Me)_2CH_2CH_2Si(OMe)_3 \qquad (Id)$$

and (MeO)₃SiCH₂CH₂(Me)₂SiO(Me₂SiO)ₓ (Ie)

$$\underset{\underset{CH_2CH_2Si(OMe)_3}{|}}{(MeSiO)_y Si(Me)_2 CH_2 CH_2 Si(OMe)_3}$$

wherein x and y are as noted above and may have such values as 100 and 5, 250 and 4, 400 and 3, 250 and 14, 100 and 7 and 400 and 9, respectively.

Examples of known and novel organopolysiloxane fluids which are useful as component (A) in the compositions of this invention include those disclosed by Brown et al., U.S. Pat. No. 3,122,522; Weyenberg, U.S. Pat. No. 3,175,993; Gignac, Jr., U.S. Pat. No. 3,509,081; and Homan, U.S. Ser. No. 520,793 (Aug. 5, 1983), the disclosures of which are incorporated herein by reference to show suitable examples of component (A) of the compositions of this invention.

It should be stated that although the formulae for the organopolysiloxanes disclosed above are written in groups of two or three types of internal siloxane units the conventional interpretation, i.e. random arrangement of internal siloxane units, of these formulae is intended.

It should also be stated that component (A) can contain trace amounts of silicon-bonded hydrogen atoms which remain unreacted after the preparation of said component without departing from the scope of this invention.

The organopolysiloxanes (Ia-e) can be prepared by any suitable method, preferably one that gives rise to a random arrangement of internal siloxane units. Accordingly, a siloxane equilibration reaction is preferably used at some point in their preparations. As is well known, siloxane equilibration provides a minor amount of cyclic, as well as a major amount of linear, organopolysiloxanes, even when terminal siloxane units are present in the equilibrating mixture. It is within the scope of the present invention to remove or not remove these cyclic organopolysiloxanes, as desired. Preferably the organopolysiloxanes of this invention do not contain more than about 15 percent by weight cyclic organopolysiloxanes that do not have alkoxysilylorganic radicals.

The organopolysiloxanes of formula (Ia-e) are preferably prepared by a process which comprises a hydrosilylation reaction between an organopolysiloxane reactant containing silicon-bonded hydrogen atoms, or alternatively, silicon-bonded aliphatically unsaturated radicals and a silane reactant containing 2 or 3 silicon-bonded —OR² radicals, 1 or 0, respectively, silicon-bonded R¹ radicals and 1 silicon-bonded aliphatically unsaturated radical or, alternatively, 1 silicon-bonded hydrogen atom, respectively. The hydrosilylation reaction thereby provides the organopolysiloxanes of this invention by creating the Q radical, delineated above, and bonding —QSiR$_a^1$(OR²)$_{3-a}$ radicals to the organopolysiloxane through the Q radical.

For example a component (A) of the compositions of this invention can be prepared by reacting, in the presence of a hydrosilylation catalyst, an organopolysiloxane reactant having the formula HR$_2^1$SiO(Me₂SiO)$_x$(HR¹SiO)$_y$SiR$_2^1$H, optionally containing up to an equilibrium amount of cyclic organopolysiloxane containing any combination of Me₂SiO siloxane units and/or HR¹SiO siloxane units, with a silane reactant having the formula CH₂=CH₂SiR$_a^1$(OR²)$_{3-a}$, taken in sufficient amount to react with all available silicon-bonded hydrogen atoms in the organopolysiloxane reactant.

As another example, a component (A) of the compositions of this invention can be prepared by reacting, in the presence of a hydrosilylation catalyst, an organopolysiloxane reactant having the formula $$\underset{\underset{CH=CH_2}{|}}{R_3^1 SiO(Me_2SiO)_x(R^1SiO)_y SiR_3^1,}$$

optionally containing up to an equilibrium amount of cyclic organopolysiloxane containing any combination of Me₂SiO siloxane units and/or $$\underset{\underset{CH=CH_2}{|}}{R^1 SiO}$$

siloxane units, with a silane reactant having the formula HSiR$_a^1$(OR²)$_{3-a}$, taken in sufficient amount to react with all available silicon-bonded vinyl radicals in the organopolysiloxane reactant.

In view of the disclosure above and the examples below one skilled in the organosilicon art will be able to conceive of other suitable methods for preparing the organopolysiloxanes (Ia-e) that are used in this invention.

Component (B) of the compositions of this invention is a titanium ester, or a partial hydrolyzate or a partial alcoholate thereof, which is soluble in components (A) plus (C), detailed below, or mixtures thereof with other components such as solvents. By soluble it is meant herein that the amount of titanium ester needed to provide the required amount of titanium will dissolve in the liquid composition to provide a homogeneous, non-settling composition. Titanium esters are well known materials; many are widely used and are commercially available.

For the purposes of this invention tetraalkyl titanates are preferred titanium esters. Examples of tetraalkyl titanates include titanium esters of ethanol, n-propanol, i-propanol, n-butanol, s-butanol, i-butanol, t-butanol, 2-ethylhexanol and octadecanol. Of the tetraalkyl titanates, tetraisopropyl titanate is the most preferred for the purposes of this invention.

If a long cure time can be tolerated or if the compositions of this invention which have been applied to a substrate can be heated to decrease the cure time thereof titanium esters other than tetraalkyl titanates can be used in the present invention. Thus aryl titanates and titanium chelates, which are expected to function in the same manner as tetraalkyl titanates in the present invention, but in a slower manner, are also contemplated in the present invention. Examples of these additional titanium esters include triethanolamine titanate, octyleneglycol titanate and bis-acetylacetonyldiisopropyl titanate.

The titanium ester can be unhydrolyzed or partially hydrolyzed. Partially hydrolyzed titanium esters are those simple and complex soluble compounds, and mixtures of soluble compounds, that are obtained when a titanium ester, particularly a tetraalkyl titanate is exposed to water. Said exposure to water can be adventitious, such as that which occurs when a container of titanium ester is open repeatedly or extensively to a moisture-containing atmosphere; or it can be deliberate, such as that which occurs when liquid water, alone or with a carrier liquid, is added to the titanium ester in a less than stoichiometric amount.

In addition to being a titanium ester or a partial hydrolyzate thereof component (B) of the compositions of this invention can be a partial alcoholate of a titanium ester. Said partial alcoholate of a titanium ester can be prepared by adding less than four, and preferably about 2, molar parts of an alcohol to one molar part of the titanium ester. Suitable alcohols include linear and branched alcohols having from 1 to 6 carbon atoms.

The compositions of the present invention will cure when exposed to moisture, irrespective of whether component (B) is a titanium ester or a partial hydrolyzate or a partial alcoholate thereof. However, the cure time of any particular composition of this invention depends critically on the age of the composition if the composition has been prepared with a tetraalkyl titanate and depends much less on the age of the composition if the composition has been prepared with a partial alcoholate or partial hydrolyzate of a tetraalkyl titanate.

For example, when a curable composition of this invention is prepared with unhydrolyzed, e.g. freshly opened, tetraisopropyl titanate, the composition should be cured by exposure to moisture within about 15 minutes after the components thereof have been mixed, preferably within about 10 minutes and most preferably within about 5 minutes, such as immediately, after the components thereof, are mixed; if a rapid cure rate is desired. A rapid cure rate means that a fully cured composition is obtained within 120 seconds after its exposure to moisture.

Contrastingly, when a composition of this invention is prepared with a partial hydrolyzate or a partial alcoholate of tetraisopropyl titanate the composition displays a rapid cure rate when exposed to moisture any time within a period of about one hour after the components thereof have been mixed.

The amount of titanium ester that is used in the compositions of this invention is merely that amount that will provide for the compositions a full cure time of less than 120 seconds as defined below. Preferably a composition to be used in the method of this invention, detailed below, will provide a fully cured coating, as hereinafter defined, within less than 60 seconds, and preferably within less than 30 seconds, after being applied to a substrate and exposed to moisture.

The amount of titanium ester component (B) to be used is that amount that will provide from 0.5 to 4.0 parts by weight of titanium (about 0.01 to 0.1 parts by mols) per 100 parts by weight of component (A), more preferably a range of from 1.5 to 2.5 parts of titanium, on the same basis, is used. In terms of the preferred titanium ester, tetraisopropyl titanate, the amounts that will provide the stated amounts of titanium are about 3 to 24 parts, preferably about 9 to 15 parts. In terms of a preferred partially methanolated tetraisopropyl titanate (TPT) (80% TPT/20% MeOH on a weight basis) the corresponding amounts are about 3.7 to 29.7 parts, preferably about 11 to 18.5 parts.

It will be apparent to one of average skill in the organopolysiloxane art that esters of vanadium oxide, zirconium or hafnium can be used in place of titanium esters, if desired, in the compositions of this invention and suitable allowance can be made therefor with respect to molar amounts and curing temperatures. Consequently, the use of the corresponding vanadium oxide, zirconium and hafnium compounds is encompassed by the recitation of titanium ester herein.

Component (C) of the compositions of this invention is any aminoorganosiloxane which contains a plurality of silicon atoms joined by divalent oxygen atoms (siloxane oxygen atoms) and bears an average of at least one silicon-bonded aminoorgano radical having the formula

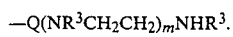

—Q(NR$^3$CH$_2$CH$_2$)$_m$NHR$^3$.

In the formula for the aminoorgano radical R$^3$ denotes, independently, a hydrogen atom or an R$^1$ radical while R$^1$ and Q have the same general meanings as stated above for component (A). In the aminoorgano radical, however, R$^3$ is preferably H and Q is preferably —C$_n$H$_{2n}$— where n is 3 or 4; such as —CH$_2$CH$_2$CH$_2$—, —CH$_2$CH$_2$CH$_2$CH$_2$— or —CH$_2$CH(CH$_3$)CH$_2$—. In addition, the nitrogen atom closest to silicon is preferably at least 3 carbon atoms removed therefrom.

In the above formula for the aminoorgano radical m denotes an integer from 0 to 3, preferably 1. Thus a highly preferred aminoorgano radical is —C$_n$H$_{2n}$NHCH$_2$CH$_2$NH$_2$, such as —(CH$_2$)$_3$NHCH$_2$CH$_2$NH$_2$ and —CH$_2$CH(CH$_3$)CH$_2$NHCH$_2$CH$_2$NH$_2$. Other examples of the aminoorgano radical include, but are not limited to; —QNHR$^3$, such as —CH$_2$CH$_2$CH$_2$NH$_2$, —CH$_2$CH(CH$_3$)CH$_2$NH$_2$ and —CH$_2$CH$_2$CH$_2$NHCH$_3$; and —QNHCH$_2$CH$_2$NHCH$_2$CH$_2$NH$_2$.

In addition to siloxane oxygen atoms other silicon-bonded radicals that are present in the aminoorganosiloxane are selected from R$^1$ radicals and OR$^2$ radicals, denoted above for component (A). As in the case of component (A), R$^1$ radicals and OR$^2$ radicals in component (C) are preferably CH$_3$ and OCH$_3$ respectively.

Being an organosiloxane, component (C) has the general formula R$_b^4$SiO$_{(4-b)/2}$ where b has a value of from greater than zero to less than 4, preferably from 1.5 to 2.5 and most preferably about 2. R$^4$ denotes an organic radical selected from R$^1$, OR$^2$ and —Q(NR$^3$CH$_2$CH$_2$)$_m$NHR$^3$, including preferred members, noted above. It should be stated that R$^4$ can further comprise trace amounts of residual silicon-bonded radicals which remain unreacted after the preparation of the aminoorganosiloxane, detailed below, without departing from the scope of this invention.

The structure of the aminoorganosiloxane can be linear, cyclic or branched and can be composed of one or more types of siloxane units selected from R$_3^4$SiO$_{\frac{1}{2}}$ units, R$_2^4$SiO$_{2/2}$ units, R$^4$SiO$_{3/2}$ units and SiO$_{4/2}$ units where R$^4$ is as delineated above. Examples of said siloxane units include R$_3^1$SiO$_{\frac{1}{2}}$ units, such as Me$_3$SiO$_{\frac{1}{2}}$, R$^1$(OR$^2$)$_2$Si$_{\frac{1}{2}}$ units, such as Me(OMe)$_2$SiO$_{\frac{1}{2}}$; R$^3$NH(CH$_2$CH$_2$NR$^3$)$_m$Q(QR$^2$)$_2$SiO$_{\frac{1}{2}}$, such as H$_2$NCH$_2$CH$_2$CH$_2$(OCH$_2$CH$_3$)$_2$SiO$_{\frac{1}{2}}$; R$_2^1$SiO$_{2/2}$ units, such as Me$_2$SiO$_{2/2}$; R$^3$NH(CH$_2$CH$_2$NR$^3$)$_m$Q(R$^1$)SiO$_{2/2}$ units, such as H$_2$NCH$_2$CH$_2$CH$_2$(Me)SiO$_{2/2}$ and H$_2$NCH$_2$CH$_2$NHCH$_2$CH$_2$CH$_2$(Me)SiO$_{2/2}$; R$^1$(OR$^2$)SiO$_{2/2}$ units, such as Me(OMe)SiO$_{2/2}$; R$^3$HN(CH$_2$CH$_2$NR$^3$)$_m$Q(OR$^2$)SiO$_{2/2}$ units, such as H$_2$NCH$_2$CH$_2$NHCH$_2$CH(CH$_3$)CH$_2$(OMe)SiO$_{2/2}$; R$^1$SiO$_{3/2}$ units, such as MeSiO$_{3/2}$; R$^3$HN(CH$_2$CH$_2$NR$^3$)$_m$QSiO$_{3/2}$ units, such as H$_2$NCH$_2$CH$_2$NHCH$_2$CH(CH$_3$)CH$_2$SiO$_{3/2}$ and H$_2$HCH$_2$CH$_2$NHCH$_2$CH$_2$CH$_2$SiO$_{3/2}$; and SiO$_{4/2}$ units.

Component (C) of the compositions of this invention is preferably a linear aminoorganosiloxane composed of a combination of $R_3^4SiO_{\frac{1}{2}}$ units and $R_2^4SiO_{2/2}$ units, such as a combination of $R_3^1SiO_{\frac{1}{2}}$ units, $R_2^1SiO_{2/2}$ units and $R^1R^4SiO_{2/2}$ units; a combination of $R^4(OR^2)_2SiO_{\frac{1}{2}}$ units, $R_2^1SiO_{2/2}$ units and $R^4(OR^2)SiO_{2/2}$ units; and a combination of $R^4R_2^1SiO_{\frac{1}{2}}$ units and $R_2^1SiO_{2/2}$ units; wherein at least one $R^4$ radical in the aminoorganosiloxane is said aminoorgano radical.

The preferred linear aminoorganosiloxane has the general formula (IIa) wherein $R^4$ is as delineated above, at least one $R^4$ radical being said aminoorgano radical, and t is an integer greater than 0, such as 10, 30, 100, 200 or more.

$$R^4{}_3SiO(R_2^4SiO)_tSiR_3^4 \qquad\qquad (IIa)$$

In formula (IIa) no silicon atom bears more than one aminoorgano radical or more than two $OR^2$ radicals.

Preferred examples of aminoorganosiloxane (IIa) have the formula (IIb) and (IIc) which represent two types of aminoorganosiloxanes based on different synthesis methods therefor.

$$R_3^1SiO(R_2^1SiO)_p(R^1R^4SiO)_qSiR_3^1 \qquad (IIb)$$

$$R^4(OR^2)_2SiO(R_2^1SiO)_rSi(OR^2)_2R^4 \qquad (IIc)$$

Consistent with the above-stated preference for $R^1$ highly preferred aminoorganosiloxanes have formulae (IId) and (IIe).

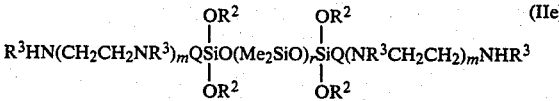

$$\text{Me}_3\text{SiO}(\text{Me}_2\text{SiO})_p(\text{MeSiO})_q\text{SiMe}_3 \qquad (IId)$$
$$\qquad\qquad\qquad\quad |$$
$$\qquad\qquad\qquad Q(NR^3CH_2CH_2)_mNHR^3$$

$$\qquad\qquad OR^2 \quad\;\; OR^2 \qquad\qquad (IIe)$$
$$\qquad\qquad\; | \qquad\quad |$$
$$R^3HN(CH_2CH_2NR^3)_mQSiO(Me_2SiO)_rSiQ(NR^3CH_2CH_2)_mNHR^3$$
$$\qquad\qquad\; | \qquad\quad |$$
$$\qquad\qquad OR^2 \quad\;\; OR^2$$

In the above formulae (IIb) and (IId), p has an average value of from about 50 to 500, preferably about 100 to 400, and q has an average value of from 1 to p/10, giving rise to p/q values from 50/1 to 500/50, such as 60/1, 65/5, 90/2, 100/1, 100/10, 150/3, 200/15 and 400/12. In the above formulae (IIc) and (IIe), r has an average value of from about 5 to 50, such as 4, 11, 35 and 50.

As noted above, aminoorganosiloxanes (IId) and (IIe) are highly preferred materials for component (C) in the compositions of this invention; however, aminoorganosiloxanes having formulae (IId) and (IIe) where, in both formulae, the aminoorgano radical has the formula —$C_3H_6NHCH_2CH_2NH_2$ or —$C_4H_8NHCH_2CH_2NH_2$ have been found to be effective for providing an adhesive-release coating having a generally direct correlation between amounts of the aminoorganosiloxane in the compositions of this invention and the release force demonstrated by the cured composition toward SBR adhesive, and are therefore highly useful in the selective release of pressure sensitive adhesives.

Aminoorganosiloxane that are suitable for use as component (C) in the composition of this invention are well known in the organosilicone art as evidenced by the numerous and diverse patents listed here. U.S. Pat. Nos. 2,754,312; 2,762,823; 2,947,771; 3,045,036; 3,355,424; 3,661,964; 3,803,196; and 3,890,269. The disclosures of these patents are incorporated herein by reference to further show aminoorganosiloxanes and how to prepare them.

In particular the disclosure of Brown, U.S. Pat. No. 3,355,424 shows the preparation of aminoorganosiloxanes containing silicon-bonded aminoorgano radicals and having the formulae (IIc) and (IIe). Briefly stated, the method of Brown involved, in part, the reaction of an aminoorganosilane having the formula $R^3NH(CH_2CH_2NR^3)_mQSiR_c{}^1(OR^2)_{3-c}$, or a partial hydrolyzate thereof, with an organosiloxane having the formula $HO(R_2^1SiO)_rH$, also known as a hydroxyl-endblocked polydiorganosiloxane. For the purposes of this invention c in the above formula has a value of 0, 1 or 2 and r has the value noted above.

Aminoorganosiloxanes having the formulae (IIb) and (IId) are preferably prepared by well-known equilibration reactions of components comprising an endblocking component, such as $R_3^1SiOSiR_3^1$, and one or more polymer backbone components, such as $(R_2^1SiO)_4$, $R^3HN(CH_2CH_2NR^3)_mSi(R^1)(OR^2)_2$ and $HO(Me_2SiO)_rH$.

The amount of the aminoorganosiloxane to be used in the compositions of this invention generally is from about 0.5 to 50 parts by weight, for every 100 parts by weight of component (A) in said composition.

As shown by the following examples about one part by weight of certain aminoorganosiloxane produces considerable increases in adhesive release when mixed with an organopolysiloxane bearing alkoxysilylorganic radicals and a titanium ester, and the resulting composition is cured on a paper substrate. Consequently, amounts less than 1 part are expected to be effective in a coating composition and amounts less than 1 part which are effective to control adhesive release levels therefrom are encompassed by the phrase, about 0.5 part.

Amounts of component (C) exceeding 50 parts by weight, per 100 parts by weight of component (A) are not necessary to provide sufficiently high adhesive release for a rapidly curing, moisture-curable coating composition.

In order to provide a release coating for styrene-butadiene rubber-based pressure sensitive adhesives that will release the adhesive with a force exceeding 100 g/in. (38.6 N/m), it is typically necessary to use from about 5 to 25 parts by weight of component (C) for every 100 parts by weight of component (A).

The compositions of this invention are prepared by mixing appropriate amounts of components (A), (B) and (C) under substantially anhydrous conditions. Preferably component (B) is added last.

Any suitable mixing means can be used for said mixing. Preferably a mixing means that will permit the prompt use, such as the substantially immediate use, of the resulting mixture as a coating composition is used.

The moisture curing compositions of this invention can further comprise the usually optional components of silicone adhesive-release compositions, such as colorants, stabilizers and diluents. Said optional components, if any, are preferably mixed before component (B) is added. When a diluent is used it may be desirable to mix said diluent with components (A) and/or (B) and/or (C) before (A), (B) and (C) are mixed with each other.

The moisture curing compositions of this invention can further comprise silanes of the formula $R_d{}^1Si(OR^2)_{4-d}$, or partial hydrolyzates thereof, if desired, to modify the cured properties of the composition. In said formula $R^1$ and $R^2$ are as delineated above and d has a value of from from zero to three, inclusive. Examples of suitable silanes include propyl orthosilicate, ethyl orthosilicate, ethyl polysilicate, methyltrimethoxy silane, cellosolve orthosilicate, dimethyldimethoxy silane and trimethyl-methoxy silane. Said silanes, if any, are preferably mixed with components (A) and/or (C) before component (B) is mixed therewith.

While not wishing to be limited by theory we believe that the compositions of this invention are something other than only a mixture of components comprising components (A), (B) and (C). In addition to the unreacted components there are also expected to be present in the compositions of this invention products of reaction between components (B) and (A) and/or (C) and between components (A) and (C), particularly when component (C) bears silicon-bonded $OR^2$ radicals.

The compositions of this invention cure rapidly when exposed to moisture and must therefore be maintained under substantially anhydrous conditions until they are applied as a thin coating to a substrate. In this coating form the compositions of this invention must be maintained under anhydrous conditions until curing thereof is desired.

In a second aspect the present invention relates to a method comprising (i) applying to a substrate a liquid composition which cures when applied to a substrate and exposed to moisture, said liquid composition being prepared by mixing, under substantially anhydrous conditions, components comprising (A) 100 parts by weight of an organopolysiloxane fluid bearing an average of at least two silicon-bonded, alkoxysilylorgano radicals per molecule, said radicals having the formula $—QSiR_a^1(OR^2)_{3-a}$ and said organopolysiloxane fluid having the formula $ZR_2^1SiO(Me_2SiO)_x(MeRSiO)_ySiR_2^1Z$, (B) a titanium ester, or a partial hydrolyzate or a partial alcoholate thereof, soluble in said liquid composition, in sufficient amount to provide from 0.5 to 4.0 parts by weight of titanium, and (C) from 0.5 to 50 parts by weight of an aminoorganosiloxane bearing an average of at least 1 silicon-bonded aminoorgano radical per molecule, said aminoorgano radical having the formula $—Q(NR^3CH_2CH_2)_mNHR^3$, all other silicon-bonded radicals of the aminoorganosiloxane being selected from the group consisting of siloxane oxygen atoms, $R^1$ radicals and $OR^2$ radicals; wherein, independently at each occurrence in the components, R denotes the $—QSiR_a^1(OR^2)_{3-a}$ radical;
$R^1$ denotes a monovalent hydrocarbon radical having from 1 to 6, inclusive, carbon atoms;
$R^2$ denotes a methyl, ethyl, propyl or methoxyethyl radical;
$R^3$ denotes a H atom or an $R^1$ radical;
Q denotes an alkylene radical;
Z denotes an R radical or an $R^1$ radical;
Me denotes a methyl radical;
a has a value of 0 or 1;
x has an average value of from about 50 to 500;
y has an average value of from 0 to $(x+y)/4$; and
m has a value of from 0 to about 3, and (ii) exposing the applied liquid composition to a moisture-containing environment until the applied composition has attained at least the desired amount of cure.

The moisture-curing compositions that are applied to a substrate in the method of this invention are those which are delineated above and claimed herein, including preferred embodiments thereof.

Generally, the above-disclosed compositions of this invention are used in the method of this invention for providing a substrate with an elastomeric coating having various adhesive-releasing capabilities, depending, as noted above, upon the relative amount and nature of component (C), the aminoorganosiloxane, that is present therein. Furthermore, in order to enhance the possibility of the applied composition having a full cure time of less than 60 seconds at room temperature it is recommended that the titanium be present as tetraisopropyl titanate or a partial hydrolyzate or alcoholate thereof.

In particular, the above-disclosed compositions of this invention which comprise an organopolysiloxane fluid having the formulae (Ib-e) above, from 1.5 to 2.5 parts of titanium as tetraisopropyl titanate or a partial hydrolyzate or alcoholate thereof and an aminoorganosiloxane are preferred for use in the method of this invention for rapidly providing a paper substrate with an adhesive-releasing coating having controllable release of PSAs. By rapidly providing it is meant in this case that a period of less than 30 seconds is required to fully cure the applied composition to a no smear, no migration, no rub-off condition, as further described below. By controllable release it is meant the establishing of the adhesive release level of a release coating for a pressure sensitive adhesive adhered thereto by selecting the amount and type of component (C) that is used to prepare the compositions of this invention.

As noted above, many liquid compositions of this invention have a cure time which depends, to various degrees, upon the amount of time that elapses between mixing the composition and exposing the composition to moisture. This characteristic must be taken into consideration when practicing the method of this invention, particularly when it is desired that the method of this invention provides a substrate with a cured organopolysiloxane coating within 60 seconds, and preferably within 30 seconds, at room temperature.

More particularly, when a composition of this invention is prepared with a highly reactive titanium ester, such as tetraisopropyl titanate, it should be applied to a substrate and exposed to moisture within a period of less than 5 minutes after being prepared if a rapid curing of the applied composition at room temperature is desired. Preferably the composition to be applied in the method of this invention is prepared with a partial hydrolyzate or alcoholate of tetraisopropyl titanate, delineated above. As noted above such a composition can be held, under anhydrous conditions, for up to 2 hours after being prepared without experiencing a significant increase in cure time.

Of course, if a longer cure time can be tolerated or a higher curing temperature can be used, the compositions of this invention can be held for a period of several hours after their preparation, if desired, before being exposed to moisture.

In the method of this invention the composition to be applied to a substrate must be maintained under substantially anhydrous conditions until at least shortly before, such as a few seconds before, it is applied to the substrate. Preferably the composition is kept under anhydrous conditions until it is applied, and most preferably until after it has been applied, to a substrate. Thereafter the applied composition can be exposed to moisture when curing thereof is desired.

The compositions of this invention should be applied to a substrate as a thin coating, such as less than 50 mils, preferably less than 5 mils and most preferably less than 0.5 mils, in thickness if a rapid curing thereof is desired. Since the curing process appears to involve the diffusion of water into the composition, thick coatings require longer cure times than thin coatings.

Although the liquid composition can be applied to a substrate by any desired method, such as brushing, spreading, flowing, extruding, rolling or spraying, proper consideration must be made of the need for maintaining the above-stated anhydrous conditions until at least shortly before the composition is to be applied when selecting a particular method. For example, in a spraying method of application comprising the use of a gaseous medium to form and apply an aerosol of the liquid composition, the liquid composition should be maintained under anhydrous conditions at least until the aerosol is formed. As another example, in a brushing, rolling or spreading method of application the liquid composition and those portions of brushes, roller and spreaders that are in contact therewith should be maintained under anhydrous conditions. An example of a method of application to a flexible sheet material which is particularly useful in the method of this invention is disclosed in an application for U.S. patent by Brown et al., entitled "Dual Web Coating Method: and assigned to the assignee of the present invention. Said application, now abandoned, filed on Oct. 18, 1982 and having U.S. Ser. No. 434,813, is incorporated herein by reference to show a method for applying the compositions of this invention.

In the method of this invention the liquid composition can be applied to the entire surface of the substrate or to a lesser portion thereof, as desired.

The substrates to which the compositions of this invention can be applied are not narrowly limited since the resulting coating thereon can functional as a water-repellant coating instead of an adhesive-release coating, if desired. As to composition they can be cellulosic, such as paper or wood; siliceous, such as concrete, brick, granite, glass, ceramic or mortar; polymeric, such as polyolefin, polyamide, polyester, polycarbonate or polyacrylate; metallic, such as steel, iron, copper, aluminum or silver; and of animal origin, such as leather and wool. As to form, they can be in fiber, filament, sheet, film, woven, flat, convoluted and composite form. However, due to the rapid curing that takes place when the compositions of this invention are exposed to moisture, substrates which can be rapidly moved past, and be coated by, a stationary source of the coating compositions, maintained under anhydrous conditions, and then be exposed to a controlled environment with respect to humidity and temperature are preferred substrates for the process of this invention.

The compositions of this invention that are applied to a substrate in the method of this invention are particularly useful for treating a flexible sheet material, such as paper or polymeric film, that is to be used as a release surface for pressure sensitive adhesives. Therefore, flexible sheet material is a preferred substrate in the method of this invention.

After the liquid composition has been applied to the substrate it is exposed to a moisture-containing environment, preferably immediately and continuously, until it cures to the extent desired, typically at least to a non-liquid state that is sufficiently rigid to permit further handling of the coated substrate. For example, in the paper coating art, wherein the paper is typically coated on one side and stored in roll form until being processed further, the applied composition need only be cured sufficiently to the dry, solid state to permit rolling of the coated paper; further curing in the roll occurring without undesirable consequences.

The moisture-content of the moisture-containing environment to which the applied composition is exposed in the method of this invention is not critical from the perspective of curing the composition. However, environments having a high moisture content, for example, 50% or more, will be more effective for rapidly curing the compositions of this invention than environments having a low moisture content. From the perspective of reproducible curing of the applied composition it is desirable to select an environment having an easily controllable relative humidity and temperature; for example, 100% and 40° C., respectively.

In a preferred embodiment of the method of this invention, wherein a liquid composition of this invention is applied to a flexible sheet material, the viscosity of the liquid composition preferably has a value of from about 300 to 5000 centipoise (0.3 to 5.0 pascal-seconds) at 25° C. Such a composition, properly formulated to have a sufficient amount of tetraisopropyl titanate as delineated herein and applied to a paper substrate at a coating weight of approximately 1 pound per ream, reacts with moisture so rapidly that it uses moisture in the paper, as well as in the atmosphere, to form a cured, adherent film at the paper/composition interface before the liquid composition can soak into the paper to any excessive extent. A beneficial result of this invention is thus the possibility to use less coating composition and/or more porous substrates in the paper coating art than previously required.

A coated flexible sheet material that has been produced by the method of this invention, delineated above, can be used as an adhesive-releasing surface, such as a peelable protective backing on a pressure sensitive adhesive label or the adhesive-free side of a pressure sensitive adhesive tape.

Accordingly, a third aspect of the present invention relates to a process comprising adhesively contacting a pressure sensitive adhesive composition with at least a part of the coated portion of the coated flexible sheet material that has been prepared by the method of this invention.

The coated flexible sheet material that is to be used in the process of this invention is those delineated above, including preferred embodiments thereof.

In this aspect of the invention the coated flexible sheet material can be contacted with a PSA composition immediately after the coating has been fully cured, i.e. to the no-smear, no-rub-off, no-migration condition as defined below, or at a later time. Preferably the fully cured coating is exposed to a moisture containing environment for at least 24 hours before being coated with a liquid PSA composition, further delineated below. There is no known upper limit to the length of time that can elapse after the coating is fully cured until it is contacted with a PSA composition in the process of this invention.

The PSA compositions that are contacted with a coated flexible sheet material of this invention can be any of the organic polymer-based PSA compositions of the art. Typical organic polymer-based PSA compositions comprise SBR copolymers or acrylate copolymers and are exemplified in the examples below.

PSA compositions based on SBR copolymers are preferred for use in the process of this invention because they typically have a lower release level from the known silicone coatings than acrylate-based PSA compositions and respond more favorably to the controlled release aspect of this invention.

The PSA compositions that are used in the process of this invention are usually liquid compositions, such as solutions, emulsions or volatile free liquids, which are typically applied to the coated flexible sheet material by standard coating methods and thereafter are converted to the tacky PSA state by a curing and/or a volatilization step to establish adhesive contact. However, it is within the scope and spirit of this invention to adhesively contact a tacky PSA with the coated flexible sheet material after said PSA has been converted to the tacky state, if desired.

By the term adhesively contacting it is meant the process of intimately positioning a PSA composition on the coating so that the tacky PSA is retained in position on the coating with substantially the fully adhesive force of the PSA for the coating.

The process of this invention is useful for preparing a laminate comprising a coating-bearing release lamina and an adhesive-bearing functional lamina wherein the adhesive is adhered to the coating. Such a laminate can take any desirable form such as a roll of adhesive tape, a strip of PSA-backed decorator paper adhered to a peelable backing and a sheet of PSA label stock to be die cut into labels. Other forms thereof will become apparent to one skilled in the PSA art on considering the present disclosure.

The following examples are disclosed to further describe, but not to limit, the present invention which is properly delineated by the claims. All parts and percentages are by weight unless stated otherwise. Herein the following abbreviatons have the stated meaning.

PSA—Pressure Sensitive Adhesive; synonymous with an organic adhesive that is tacky, but dry, to the touch and will adhere to a clean stainless steel mirror with a force of at least 1 N/m. The PSA may or may not be removable therefrom and still possess tack.

SBR—Styrene-Butadiene Rubber; indicates the elastomeric component of a PSA designated as SBR.

CRA—Controlled Release Additive; synonymous with aminoorganosiloxane and component (C).

CRA Nos. 1 and 2, noted in Examples 1, 2 and 3, were prepared by equilibrating suitable amounts of $Me_3SiO(Me_2SiO)_4SiMe_3$, $HO(Me_2SiO)_{35}H$, and $H_2NCH_2CH_2NHCH_2CH(CH_3)CH_2Si(Me)(OMe)_2$ at elevated temperature in the presence of aqueous alkali in the well known manner.

CRA Nos. 3 and 4, noted in Examples 4 and 5, were prepared by reacting $HO(Me_2SiO)_{36}H$ or $HO(Me_2SiO)_{12}H$ with appropriate amounts of with $H_21(H_2CH_2NHCH_2CH_2CH_2Si(OMe)_3$ in 10% isopropyl alcohol.

RA-1753—Acrylic solvent cast adhesive. Monsanto Co.; St. Louis, MO. Room temperature cured.

GMS-263—Acrylic solvent cast adhesive. Monsanto Co.; St. Louis, MO. Heat cured.

36-6045—Rubber based (SBR) solvent cast adhesive. National Starch and Chemical Corp.; Somerville, NJ.

72-9399—Acrylic emulsion cast adhesive, high tack permanent adhesive. National Starch and Chemical Corp.; Somerville, NJ.

38-4516—Acrylic emulsion cast adhesive, removable adhesive. National Starch and Chemical Corp.; Somerville, NJ.

Full cure time of a curable composition was measured by applying the freshly prepared composition to super calendered S2S kraft paper at a coating weight of about 1 pound/ream using a laboratory blade coater and exposing the applied composition to an atmosphere having a relative humidity of 50±4% at 77±2° F. The time required from exposure to moisture until the applied composition cured to the no smear, no rub-off, no migration state was noted as the full cure time.

The smear of a coating was measured by lightly rubbing the coating with a finger and looking for hazing of the coating. The degree of haze (none, very slight, slight, moderate, gross) that was observed indicated the degree of smear of the coating. A fully cured coating demonstrates no smear.

The rub-off of a coating was measured by vigorously rubbing the coating with the index finger tip, trying to remove the coating from the paper. The extent of rub-off was described as none, very slight, slight, moderate or gross. A fully cured coating demonstrates no rub-off.

Migration of a coating was measured by placing a test strip of No. 5910 3M ® (St. Paul, Minn.) brand transparent tape on the coating, adhesive-bearing surface in contact with the coating, and rubbing the strip 5 to 20 times with a finger to adhere it to the coating. The strip of transparent tape was then removed from the coating and its adhesive-bearing surface was doubled, end to end, onto itself and pressed firmly together. The force needed to separate the doubled test strip is approximately the same as the force needed to separate a doubled strip of fresh tape for a coating having a rating of no migration. Other ratings include very slight, slight, moderate and gross migration. A fully cured coating demonstrates no migration.

Adhesive release for a coating was measured on a fully cured coating that further had been aged for at least two hours at room temperature and room relative humidity.

Each cured coating was prepared for release testing according to the following procedure. The cured coating was coated with adhesive solution or emulsion (listed above) at a wet thickness of 3 mils (76.2 μm) using a draw down bar. The applied adhesive composition was air-dried at room temperature for one minute for solutions and 3 minutes for emulsions, heated at 70° C. for one minute for solutions and 3 minutes for emulsions and then cooled to room temperature again for 1 minute. A sheet of 60 pound matte litho was applied to the dried adhesive and the resulting laminate was rolled with a 4.5 pound rubber coated roller and heated at 70° C. for one day. Aging of the laminate at 70° C. for 2 weeks or 6 weeks was sometimes done.

Release testing of the laminates was accomplished by cooling the laminates to room temperature, cutting the cooled laminates into 1 inch (25.4 mm) strips and pulling the matte/adhesive lamina from the kraft paper/coating lamina at an angle of 180° (π radians) at 400 inches/minute (0.17 m/s). The force, in grams per inch, that was required to separate the laminae was noted as adhesive release. This value was converted to newtons per meter (N/m) for this disclosure by multiplying by 0.3860885 in.N/g.m and rounding off to three significant figures.

EXAMPLE 1

Two compositions of this invention were prepared by mixing 11.1 parts tetraisopropyl titanate (1.87 parts of Ti) with 100 parts of a mixture of an organopolysiloxane having the formula $RMe_2SiO(Me_2SiO)_{142}(MeRSiO)_3SiMe_2R$, where R denotes $-CH_2CH_2Si(OMe)_3$, and an aminoorganosiloxane (CRA No. 1) having the formula

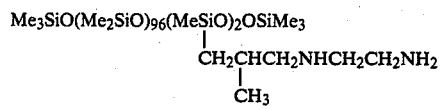

and containing about 13% cyclopolydimethylsiloxanes (cyclics). The amount of aminoorganosiloxane plus cyclics in the two compositions was 1.0 and 5.3 parts per 100 parts of the organopolysiloxane bearing R radicals. A control composition containing no aminoorganosiloxane was similarly prepared. The control composition and the two compositions of this invention had full cure times of 20 seconds or less.

The three compositions were coated onto S2S kraft paper and exposed to a 50% relative humidity atmosphere at room temperature for 24 hours. The coated paper was then laminated with GMS-263 acrylic PSA composition or 36-6045 SBR PSA composition and the resulting 6 samples were tested for adhesive release after being heated at 70° C. for 1 day. The control sample containing no aminoorganosiloxane released acrylic adhesive with a force of 34.0 N/m and SBR adhesive with a force of B 16.2 N/m. These values were raised to 57.1 and 27.0 N/m, respectively, when 1.0 part of the aminoorganosiloxane was used. The sample containing 5.3 parts of the aminoorganosiloxane released acrylic adhesive with a force of 103 N/m.

EXAMPLE 2

Four compositions of this invention were prepared by mixing 13.9 parts of a mixture of 80% TPT (tetraisopropyl titanate) and 20% dry methanol (1.87 parts of Ti) with 100 parts of a mixture of an organopolysiloxane having the formula $Me_3SiO(Me_2SiO)_{210}(MeRSiO)_{12}SiMe_3$ wherein R denotes $-CH_2CH_2Si(OMe)_3$, and the aminoorganosiloxane (CRA No. 1) disclosed in Example 1. The amount of CRA No. 1+cyclics was varied from 1.0 to 17.7 parts per 100 parts of the organopolysiloxane bearing R radicals. A control composition containing no aminoorganosiloxane was also similarly prepared. The control composition and the four compositions of this invention had full cure times of 25 seconds or less and were visibly clear.

The five compositions were coated onto S2S kraft paper and exposed, at room temperature, to a 50% relative humidity atmosphere for 24 hours and the cured coatings were then laminated with one of three acrylic PSA compositions or an SBR PSA compositions to provide 20 laminates. The laminates were tested for adhesive release force after being heated for 1 day at 70° C. and after being aged for 6 weeks at 70° C. to simulate long term shelf aging. The results are listed in Table I.

These data show the wide range of adhesive release values that can be obtained from the rapidly curing, moisture-curable coating compositions of this invention by varying the amount of component (C) that is used therein.

TABLE I

| PSA Compositions | 70° C. Aging Weeks | PSA Release, N/m vs. Parts of CRA No. 1 | | | | |
|---|---|---|---|---|---|---|
| | | 0 | 1.0 | 5.3 | 11.1 | 17.7 |
| 36-6045 | 0 | 16.2 | 19.3 | 28.2 | 61.0 | 99.6 |
| | 6 | 13.5 | 16.6 | 77.2 | 82.2 | Tore |
| RA-1753 | 0 | 47.5 | 52.1 | 45.6 | 57.1 | 60.6 |
| | 6 | 35.9 | 40.9 | 59.5 | 77.2 | 96.5 |
| 72-9399 | 0 | 34.0 | 35.1 | 38.6 | 77.2 | 101.5 |
| | 6 | 24.3 | 29.0 | 82.2 | 96.5* | 154* |
| 38-4516 | 0 | 37.8 | 37.8 | 71.0 | 77.2 | 96.5 |
| | 6 | 35.1 | 31.3 | 90.0 | 126 | 131* |

*PSA lost tack

EXAMPLE 3

Three compositions of this invention were prepared by mixing 13.9 parts of the tetraisopropyl titanate-methanol mixture that was used in Example 2 with 100 parts of a mixture of the organopolysiloxane bearing alkoxysilylorganic radicals that was used in Example 2 and an aminoorganosiloxane (CRA No. 2) having the formula

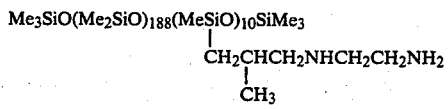

and containing about 13% cyclopolydimethylsiloxane (cyclics). The amount of CRA No. 2+cyclics was varied from 5.3 to 17.7 parts per 100 parts of organopolysiloxane bearing alkoxysilylorganic radicals. A control composition containing no aminoorganosiloxane was also similarly prepared. These four compositions had full cure times of 15 second or less. The three compositions of this invention were visibly opaque.

The four compositions were coated onto S2S kraft paper and exposed, at room temperature, to a 50% relative humidity atmosphere for 1 day and the cured coatings were then laminated with several PSA compositions. The laminates were then either heated for 1 day at 70° C. and tested or aged at 70° C. for 6 weeks to simulate long term shelf aging and the adhesive release force was thereafter measured. The results are summarized in Table II.

TABLE II

| PSA Compositions | 70° C. Aging Weeks | PSA Release, N/m vs. Parts of CRA No. 2 | | | |
|---|---|---|---|---|---|
| | | 0 | 5.3 | 11.1 | 17.7 |
| 36-6045 | 0 | 14.3 | 22.4 | 57.9 | 135 |
| | 6 | 14.3 | 48.3 | Tore | Tore |
| RA-1753 | 0 | 39.0 | 39.4 | 54.1 | 74.1 |
| | 6 | 57.9 | 59.5 | 77.2 | 96.5 |
| 72-9399 | 0 | 31.7 | 44.4 | 93.4 | 135 |
| | 6 | 26.6 | 96.5 | 146* | 154* |
| 38-4516 | 0 | 40.9 | 51.7 | 68.7 | 88.4 |
| | 6 | 49.5 | 70.7 | 82.2 | 95.0 |

*PSA lost tack

EXAMPLE 4

Three compositions of this invention were prepared by mixing 13.9 parts of the tetraisopropyl titanate-methanol mixture that was used in Example 2 with 100 parts of a mixture of the organopolysiloxane bearing alkoxysilylorganic radicals that was used in Example 2 and an aminoorganosiloxane (CRA No. 3) having the nominal formula

and containing about 10% isopropyl alcohol. The amount of aminoorganosiloxane alone was varied from 5.3 to 11.1 to 25.0 parts per 100 parts of organopolysiloxane bearing alkoxysilylorganic radicals. A control composition containing no aminoorganosiloxane was also prepared similarly. These four compositions were visibly clear and had full cure times of 15 seconds or less.

These four compositions were coated onto S2S kraft paper and exposed, at room temperature, to a 50% relative humidity atmosphere for periods of 1 day and 1 week, after which the eight cured coatings were laminated with five PSA compositions and heated at 70° C. for 1 day. Each of the resulting 40 laminates was divided into halves and one half was then tested, without further heating, for initial adhesive release force to simulate the removal of a waste matrix in a label cutting operation. The other half of the 40 laminates was aged for 2 weeks at 70° C. to simulate average shelf aging of the labels and then was tested for adhesive release force. Results are summarized in Table III.

TABLE III

| PSA Com-positions | CRA No. 3 parts | PSA Release Force, N/m | | | |
|---|---|---|---|---|---|
| | | Cured 1 Day | | Cured 1 Week | |
| | | Initial | 2 Wk/70° C. | Initial | 2 Wk/70° C. |
| RA-1753 | 0 | 39.0 | 40.5 | 31.7 | 36.3 |
| | 5.3 | 43.6 | 69.1 | 35.9 | 55.6 |
| | 11.1 | 57.9 | Tore | 51.3 | 61.8 |
| GMS-263 | 5.3 | 20.1 | 53.7 | 18.1 | 41.3 |
| | 11.1 | 19.3 | 35.9 | 19.3 | 40.5 |
| | 25.0 | Tore | Tore | 59.8 | 129 |
| 36-6045 | 5.3 | 20.5 | 26.3 | 18.5 | 19.3 |
| | 11.1 | 27.8 | 35.9 | 22.4 | 25.1 |
| | 25.0 | 154 | Tore | 68.7 | 82.2 |
| 72-9399 | 0 | 31.7 | 37.1 | 29.0 | 30.9 |
| | 5.3 | 28.2 | 40.2 | 30.1 | 41.3 |
| | 11.1 | 49.4 | 98.1 | 39.4 | 53.3 |
| 38-4516 | 5.3 | 38.2 | 62.9 | 40.5 | 57.9 |
| | 11.1 | 43.6 | 77.2 | 50.2 | 67.6 |
| | 25.0 | 77.2 | 114 | 55.2 | 75.7 |

EXAMPLE 5

Three compositions of this invention were prepared by repeating the preparations of Example 4, except an aminoorganosiloxane (CRA No. 4) having the nominal formula

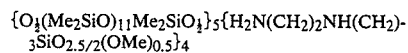

was used instead of CRA No. 3. Like CRA No. 3, CRA No. 4 also contained 10% isopropyl alcohol. The amount of aminoorganosiloxane alone was varied from 5.3 to 11.1 to 25.0 parts per 100 parts of organopolysiloxane bearing alkoxysilylorganic radicals. The three compositions were visibly opaque and had full cure times of 20 seconds or less.

These compositions were tested by the procedure listed in Example 4. The results are summarized in Table IV.

TABLE IV

| PSA Com-positions | CRA No. 4 parts | PSA Release Force, N/m | | | |
|---|---|---|---|---|---|
| | | Cured 1 Day | | Cured 1 Week | |
| | | Intial | 2 Wk/70° C. | Initial | 2 Wk/70° C. |
| RA-1753 | 5.3 | 43.6 | 55.2 | 34.4 | 45.6 |
| | 11.1 | 51.7 | 74.1 | 36.7 | 63.7 |
| | 25.0 | 88.4 | 121 | 45.6 | 77.2 |
| GMS-263 | 5.3 | 23.9 | 34.7 | 21.2 | 45.9 |
| | 11.1 | 25.1 | 35.5 | 18.5 | 31.7 |
| | 25.0 | 43.6 | 77.2 | 24.3 | 42.5 |
| 36-6045 | 5.3 | 19.3 | 22.4 | 17.4 | 22.4 |
| | 11.1 | 23.9 | 32.8 | 20.5 | 30.1 |
| | 25.0 | 61.0 | 69.9 | 39.4 | 49.4 |
| 72-9399 | 5.3 | 41.3 | 45.2 | 31.7 | 43.2 |
| | 11.1 | 35.9 | 56.0 | 27.0 | 48.3 |
| | 25.0 | 116 | 154 | 54.8 | 113 |
| 38-4516 | 5.3 | 57.9 | 77.2 | 52.9 | 85.3 |
| | 11.1 | 62.2 | 80.3 | 62.9 | 88.4 |
| | 25.0 | 72.6 | 102 | 67.6 | 109 |

That which is claimed is:
1. A method comprising
   (i) applying to a substrate a liquid composition which cures when applied to a substrate and exposed to moisture, said liquid composition being prepared by mixing, under substantially anhydrous conditions, components comprising
   (A) 100 parts by weight of an organopolysiloxane fluid bearing an average of at least two silicon-bonded, alkoxysilylorganic radicals per molecule, said radicals having the formula $-QSiR_a^1(OR^2)_{3-a}$ and said organopolysiloxane fluid having the formula $ZR_2^1SiO(Me_2SiO)_x(MeRSiO)_ySiR_2^1Z$,
   (B) a titanium ester, or a partial hydrolyzate or a partial alcoholate thereof, soluble in said liquid composition, in sufficient amount to provide from 0.5 to 4.0 parts by weight of titanium, and
   (C) from 0.5 to 50 parts by weight of an aminoorganosiloxane bearing an average of at least 1 silicon-bonded aminoorgano radical per molecule, said aminoorgano radical having the formula $-Q(NR^3CH_2CH_2)_mNHR^3$, all other silicon-bonded radicals of the aminoorganosiloxane being selected from the group consisting of siloxane oxygen atoms, $R^1$ radicals and $OR^2$ radicals; wherein, independently at each occurrence in the components,
   R denotes the $-QSiR_a^1(OR^2)_{3-a}$ radical;
   $R^1$ denotes a monovalent hydrocarbon radical having from 1 to 6, inclusive, carbon atoms;
   $R^2$ denotes a methyl, ethyl, propyl or methoxyethyl radical;
   $R^3$ denotes a H atom or an $R^1$ radical;
   Q denotes an alkylene radical;
   Z denotes an R radical or an $R^1$ radical;
   Me denotes a methyl radical;
   a has a value of 0 or 1;
   x has an average value of from about 50 to 500;
   y has an average value of from 0 to $(x+y)/4$; and
   m has a value of from 0 to about 3, and
   (ii) exposing the applied liquid composition to a moisture-containing environment until the applied composition has attained at least the desired amount of cure.
2. A method according to claim 1 wherein each $R^1$ radical is a methyl radical and the titanium ester is a tetraalkyl titanate or a partial hydrolyzate or partial alcoholate thereof.

3. A method according to claim 2 wherein the liquid composition has a viscosity at 25° C. of from about 300 to 5000 centipoise and the substrate is a flexible sheet material.

4. A method according to claim 3 wherein the tetraalkyl titanate is tetraisopropyl titanate, the value of y in component (A) does not exceed the value of $3600/(x+y)$ for values of $(x+y)$ exceeding 120 and the aminoorganosiloxane has the formula

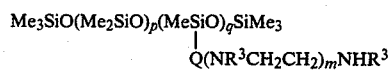

wherein p has an average value of from about 50 to 500 and q has an average value of from about 1 to p/10.

5. A method according to claim 4 wherein Z denotes Me, component (B) is a partial methanolate of tetraisopropyl titanate and the aminoorganosiloxane has the formula

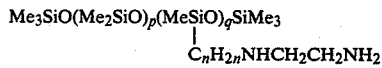

wherein n has a value of 3 or 4.

6. A method according to claim 3 wherein the tetraalkyl titanate is tetraisopropyl titanate, the value of y in component (A) does not exceed the value of $3600/(x+y)$ for values of $(x+y)$ exceeding 120 and the aminoorganosiloxane has the formula

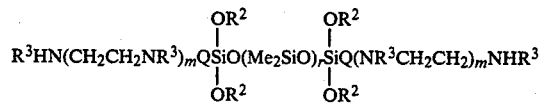

wherein r has an average value of from about 5 to 250.

7. A method according to claim 6 wherein Z denotes Me, component (B) is a partial methanolate of tetraisopropyl titanate and the aminoorganosiloxane has the formula

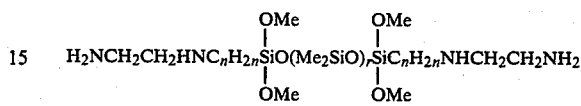

wherein n has a value of 3 or 4.

8. A coated flexible sheet material prepared by the method of claim 3.

9. A coated paper flexible sheet prepared by the method of claim 3.

10. A process comprising adhesively contacting a pressure sensitive adhesive composition with at least a portion of the coated portion of the coated flexible sheet material of claim 8.

11. A process according to claim 10 wherein the flexible sheet material is paper.

12. A process according to claim 11 wherein the pressure sensitive adhesive composition is a liquid, styrene-butadiene-rubber composition.

13. A process according to claim 10 wherein the entire coated portion of the coated flexible sheet material is adhesively contacted with the pressure sensitive adhesive composition.

14. A process according to claim 13 wherein the flexible sheet material is paper.

* * * * *

UNITED STATES PATENT AND TRADEMARK OFFICE
CERTIFICATE OF CORRECTION

PATENT NO. : 4,530,882
DATED : 12-31-85
INVENTOR(S) : Kenneth Christopher Fey

It is certified that error appears in the above-identified patent and that said Letters Patent is hereby corrected as shown below:

In col. 8, line 56, "$R^1(OR^2)_2Si_{1/2}$" should read --$R^1(OR^2)_2SiO_{1/2}$--

In col. 8, line 57, "$R^3NH(CH_2CH_2NR^3)_mQ(QR^2)_2SiO_{1/2}$" should read --$R^3NH(CH_2CH_2NR^3)_mQ(OR^2)_2SiO_{1/2}$--

In col. 15, line 58, "$H_2l(H_2CH_2NHCH_2CH_2CH_2Si(OMe)_3$" should read --$H_2NCH_2CH_2NHCH_2CH_2CH_2Si(OMe)_3$--

In col. 17, line 34, delete "B"

In col. 18, line 60, insert "*" before "PSA"

Signed and Sealed this

Tenth Day of June 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,530,882
DATED : July 23, 1985
INVENTOR(S) : Gary R. Homan and David L. Stickles It is certified that error appears in the above-identified patent and that said Letters Patent is hereby corrected as shown below:

In Col. 8, line 56, "$R^1(OR^2)_2Si_{1/2}$" should read --$R^1(OR^2)_2SiO_{1/2}$--

In Col. 8, line 57, "$R^3NH(CH_2CH_2NR^3)_mQ(QR^2)_2SiO_{1/2}$" should read --$R^3NH(CH_2CH_2NR^3)_mQ(OR^2)_2SiO_{1/2}$--

In Col. 15, line 58, "$H_2l(H_2CH_2NHCH_2CH_2CH_2Si(OMe)_3$" should read --$H_2NCH_2CH_2NHCH_2CH_2CH_2Si(OMe)_3$--

In Col. 17, line 34, delete "B"

In Col. 18, line 60, insert "*" before "PSA".

This certificate supersedes Certificate of Correction issued June 10, 1986.

Signed and Sealed this

Fourteenth Day of October, 1986

[SEAL]

Attest:

DONALD J. QUIGG

Attesting Officer

Commissioner of Patents and Trademarks